US006646972B2

(12) United States Patent
Morishita

(10) Patent No.: US 6,646,972 B2
(45) Date of Patent: Nov. 11, 2003

(54) OPTICAL PICKUP DEVICE AND OPTICAL DISC DEVICE

(75) Inventor: Tomoaki Morishita, Shizuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/133,412

(22) Filed: Apr. 29, 2002

(65) Prior Publication Data

US 2002/0159341 A1 Oct. 31, 2002

Related U.S. Application Data

(60) Continuation of application No. 09/680,478, filed on Oct. 6, 2000, now Pat. No. 6,404,723, which is a division of application No. 08/997,327, filed on Dec. 23, 1997, now Pat. No. 6,185,180.

(30) Foreign Application Priority Data

Dec. 26, 1996 (JP) .............................................. 8-348813

(51) Int. Cl.[7] ................................................. G11B 7/00
(52) U.S. Cl. ....................................... 369/71; 369/44.14
(58) Field of Search ............................. 369/71, 72, 73, 369/74, 75.1, 75.2, 77.1, 77.2, 44.14, 44.15, 44.16, 44.21, 44.22; 359/823, 824, 813, 814

(56) References Cited

U.S. PATENT DOCUMENTS

| | | | | |
|---|---|---|---|---|
| 4,727,529 A | * | 2/1988 | Araki et al. | ............. 369/44.16 |
| 5,245,601 A | * | 9/1993 | Hake | ............................ 369/72 |
| 5,615,196 A | * | 3/1997 | Kato | ............................ 369/71 |
| 5,995,467 A | * | 11/1999 | Ohyama et al. | ............... 369/71 |

FOREIGN PATENT DOCUMENTS

JP      06036541 A      *   2/1994

* cited by examiner

Primary Examiner—Thang V. Tran
(74) Attorney, Agent, or Firm—Rader, Fishman & Grauer PLLC; Ronald P. Kananen

(57) ABSTRACT

An optical pickup device is positioned in confronting relationship to an optical disc for reading an information signal from and/or writing an information signal on the optical disc. The optical pickup device includes an optical unit having at least a light source for emitting a light beam and a photodetector for detecting a light beam returned from the optical recording medium, and a converging system for converging the light beam emitted from the light source onto a signal recording surface of the optical recording medium. The optical unit includes a light guide for guiding the light beam toward the converging system and a light-transmissive optical plate covering the light guide.

2 Claims, 8 Drawing Sheets

OPTICAL PICKUP DEVICE AND OPTICAL DISC DEVICE

This application is a continuation of the patent application Ser. No. 09/680,478, filed Oct. 6, 2000, now U.S. Pat. No. 6,404,723, filed Dec. 23, 1997, now U.S. Pat. No. 6,185,180.

BACKGROUND OF THE INVENTION

1. Field of the Invention

The present invention relates to an optical pickup device for reading an information signal from and/or writing an information signal on an optical recording medium such as an optical disc, and an optical disc device which incorporates such an optical pickup device.

2. Description of the Prior Art

Heretofore, there have been proposed optical recording mediums such as optical discs and optical pickup devices for reading an information signal from such optical recording mediums. The optical pickup devices comprise a light source such as a semiconductor laser and optical components including an objective lens for converging a beam of light emitted by the light source onto a signal recording surface of the optical recording medium, and a beam splitter and other optical elements. The optical pickup devices read an information signal recorded on the signal recording surface by applying a converged beam of light onto the signal recording surface and detecting a beam of light reflected from the signal recording surface with a light detector.

An optical disc as an optical recording medium is held at its central area on a disc table in a disc player which incorporates an optical pickup device, and rotated about its own axis by a spindle motor coupled to the disc table. In the disc player, the optical pickup device is positioned so as to direct the objective lens toward the signal recording surface of the optical disc which is rotated. The optical pickup device is supported so as to be movable radially across the optical disc.

An information signal is recorded on the optical disc along a spiral pattern of recording tracks that are substantially concentrically arranged on the signal recording surface. When the optical disc is rotated about its own axis, the optical pickup device reads the recorded information signal along the recording tracks.

During rotation of the optical disc, the readout position where the optical pickup device reads an information signal from any of the recording tracks is periodically reciprocally moved radially of the optical disc because of an off-center deviation of the center of curvature of the recording track from the center of rotation of the optical disc, i.e., the central axis of the drive shaft of the spindle motor. In addition, the readout position on the signal recording surface is also periodically reciprocally moved perpendicularly to the signal recording surface due to a distortion or planarity error of the disc board of the optical disc.

To cope with such an off-center deviation and planarity error, the optical pickup device usually has an objective lens drive mechanism comprising a two-axis actuator. The objective lens drive mechanism supports the objective lens for movement along both an optical axis thereof and a direction normal to the optical axis, i.e., a radial direction of the optical disc. The objective lens drive mechanism moves the objective lens based on signals (a tracking error signal and a focusing error signal) which are representative of deviations or distances of the spot of light converged on the signal recording surface by the objective lens from the recording track in both the radial direction of the optical disc and the direction normal to the signal recording surface.

The beam of light emitted from the light source is guided to the objective lens by a light guide mechanism which comprises optical components including a beam splitter and is housed in a cavity defined in an optical unit housing along the optical axis of the objective lens.

The objective lens is moved by the objective lens drive mechanism to keep the beam of light focused on the recording tracks at all times so as to follow periodical fluctuations of the recording tracks.

As described above, the objective lens is moved by the-objective lens drive mechanism in both the direction of the optical axis of the objective lens and the direction normal to the optical axis. The objective lens and the two-axis actuator of the objective lens drive mechanism are usually enclosed by a cover which prevents dust particles from entering and being deposited on the objective lens and the two-axis actuator. The cover has a through hole, whose size is greater than the diameter of the objective lens, defined in its portion in front of the objective lens for passing the beam of light therethrough, and hence the objective lens is exposed through the through hole. The cavity which houses the light guide mechanism is open and spaced from the objective lens by a predetermined distance. Consequently, while the disc player is in use or not in use, i.e., is in storage or shipment, dust particles tend to be deposited on the surface of the objective lens, and find their way into the cavity, possibly resulting in a failure to read the information signal from the optical disc. When dust particles are deposited on the two-axis actuator (which includes a support art, etc.), the objective lens drive mechanism may not be properly operated.

Particularly, fine sand particles or dust particles can easily be deposited on the objective lens and the support arm of the two-axis actuator, posing problems on maintaining desired playback characteristics with respect to the optical disc. The surface of the objective lens may be cleaned by a brush or an air blower. However, since fine sand particles or dust particles are liable to stick to the brush, they cannot sufficiently be removed from the surface of the objective lens with the brush. If fine sand particles or dust particles deposited on the surface of the objective lens are dampened, then it is difficult to remove them from the objective lens.

When dust particles and fine sand particles enter and are deposited in the cavity of the optical unit housing, it is highly difficult to remove them with the brush or the air blower.

In some applications, the disc player described above is incorporated into stationary unitary audio playback systems where the disc player is housed in a common casing shared by an amplifier, a radio tuner, etc. The casing necessarily requires an opening or openings for radiating the heat from the amplifier, the radio tuner, etc., and the optical components in the cavity, particularly the objective lens, cannot be cleaned with ease because the optical pickup device is housed in the casing. Stated otherwise, despite the fact that the entry of dust and dirt into the casing cannot be avoided, it is practically impossible to clean the optical components, particularly the objective lens, of the optical pickup device in the stationary unitary audio playback systems.

SUMMARY OF THE INVENTION

It is therefore an object of the present invention to provide an optical pickup device which prevents dust particles from being deposited on optical components of a light guide mechanism housed in a casing for thereby maintaining good playback characteristics with respect to an optical recording medium.

Another object of the present invention to provide an optical disc device which incorporates such an optical pickup device.

According to the present invention, there is provided an optical pickup device adapted to be positioned in confronting relationship to an optical recording medium for reading an information signal from and/or writing an information signal on the optical recording medium, comprising an optical unit having at least a light source for emitting a light beam and a photodetector for detecting a light beam returned from the optical recording medium, and a converging system for converging the light beam emitted from the light source onto a signal recording surface of the optical recording medium, the optical unit including a light guide for guiding the light beam toward the converging system and a light-transmissive optical plate covering the light guide.

According to the present invention, there is also provided an optical disc device adapted to be positioned in confronting relationship to an optical disc for reading an information signal from and/or writing an information signal on the optical disc, comprising a drive mechanism for rotating the optical disc, an optical pickup comprising an optical unit having at least a light source for emitting a light beam and a photodetector for detecting a light beam returned from the optical recording medium, and a converging system for converging the light beam emitted from the light source onto a signal recording surface of the optical disc, and a moving mechanism for moving the optical pickup with respect to the optical disc in a radial direction of the optical disc, the optical unit including a light guide for guiding the light beam toward the converging system and a transparent optical plate covering the light guide.

DETAILED DESCRIPTION OF THE PREFERRED EMBODIMENT

In a preferred embodiment of the present invention, an optical pickup device is incorporated in a disc drive for reading an information signal from an optical disc as an optical recording medium. Prior to describing the optical pickup device, the optical disc and the disc drive will first be described below.

The optical pickup device according to the embodiment of the present invention is illustrated as being used to read a recorded information signal. However, the optical pickup device may be used to write an information signal on an optical disc.

Figure 1:
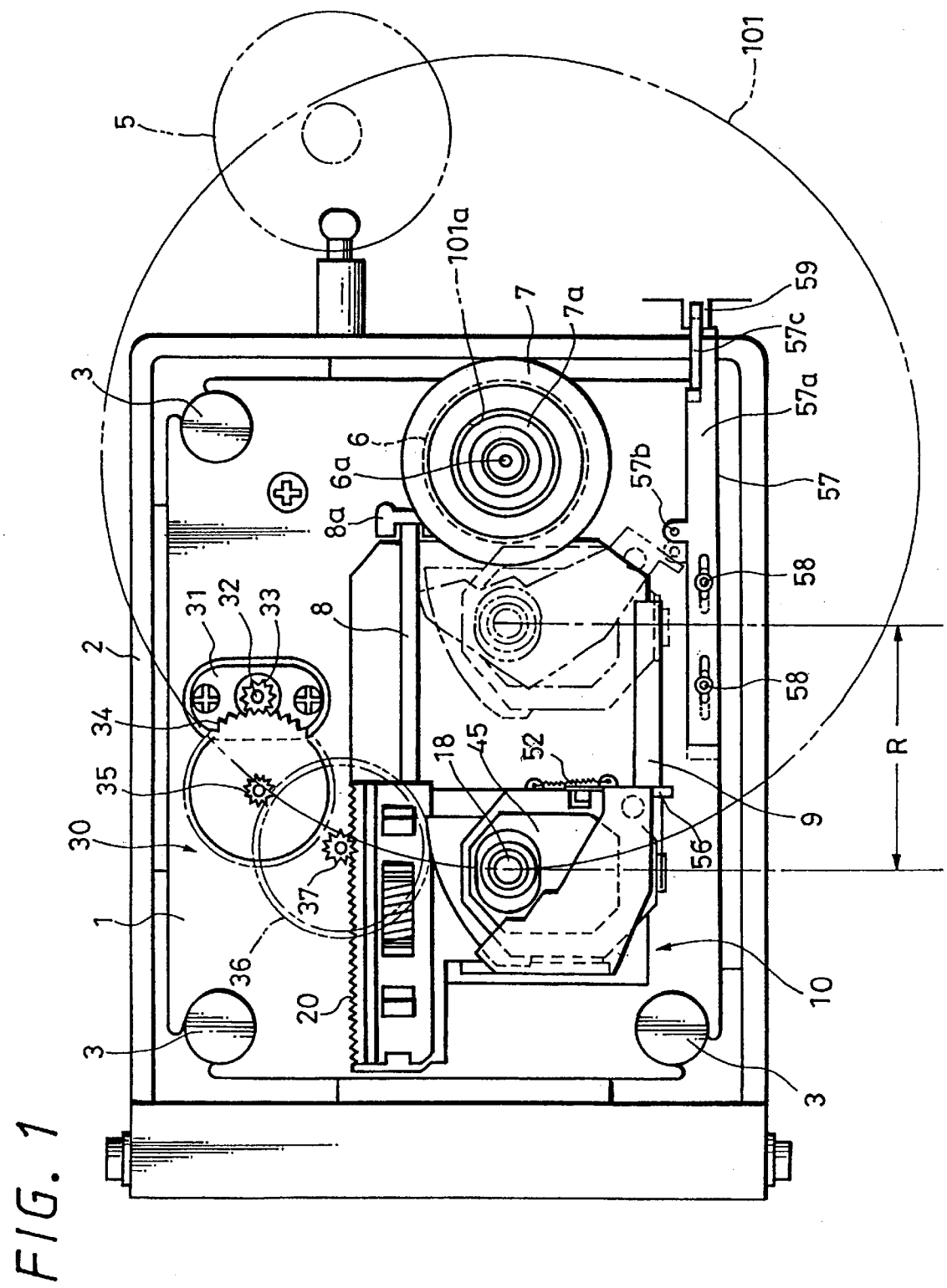
FIG. 1 is a plan view of a disc drive which incorporates an optical pickup device according to the present invention.
Figure 2:
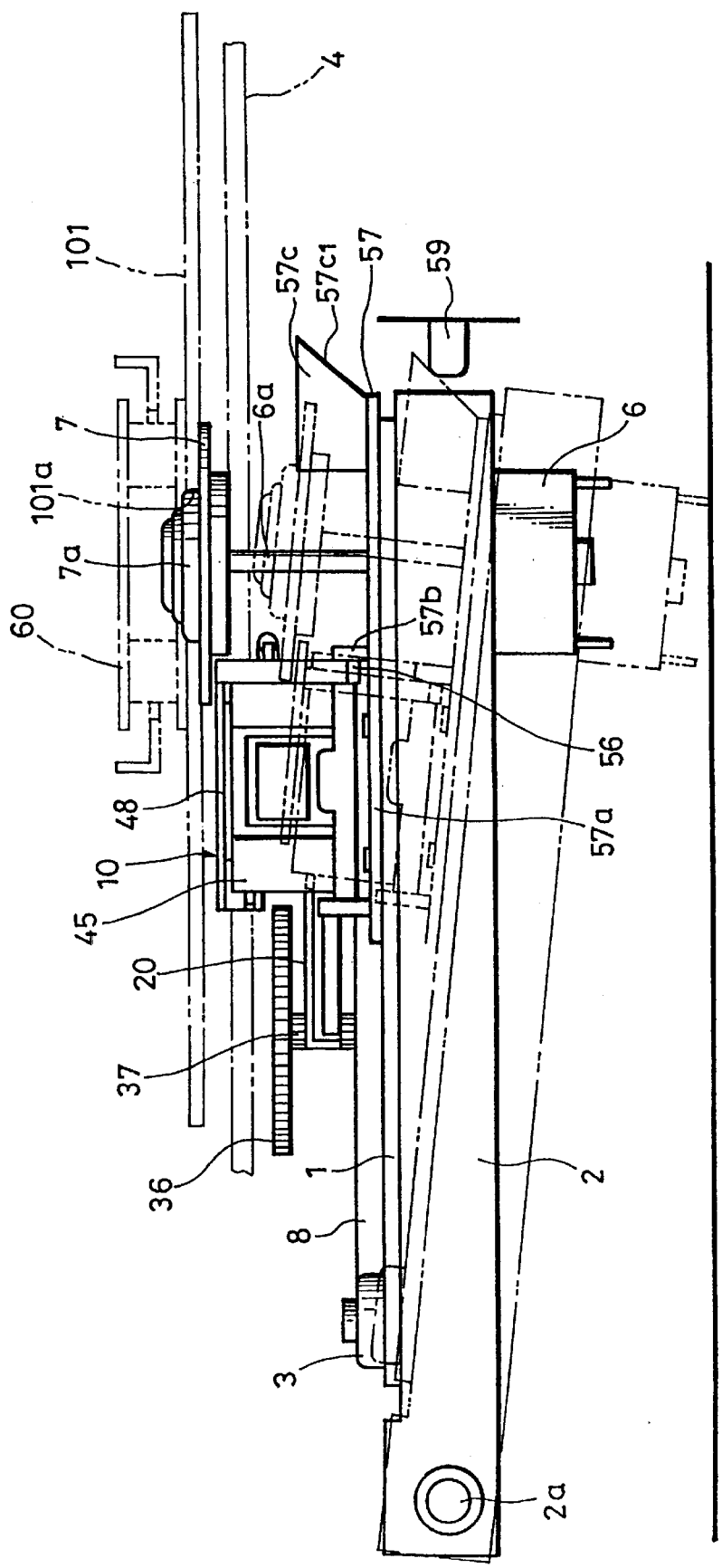
FIG. 2 is a side elevational view of the disc drive shown in FIG. 1.
Figure 3:
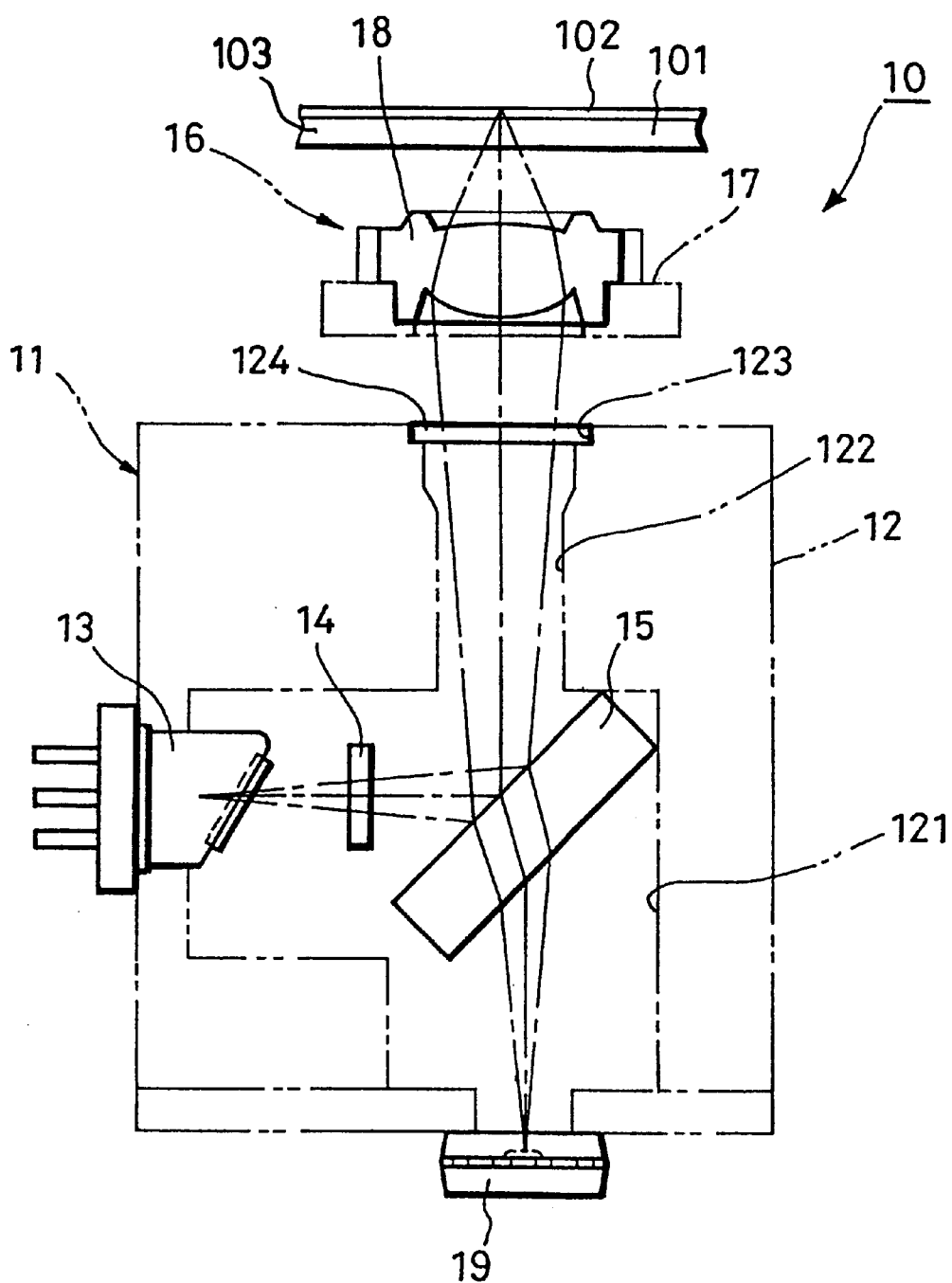
FIG. 3 is a schematic vertical cross-sectional view of the optical pickup device.
Figure 4:
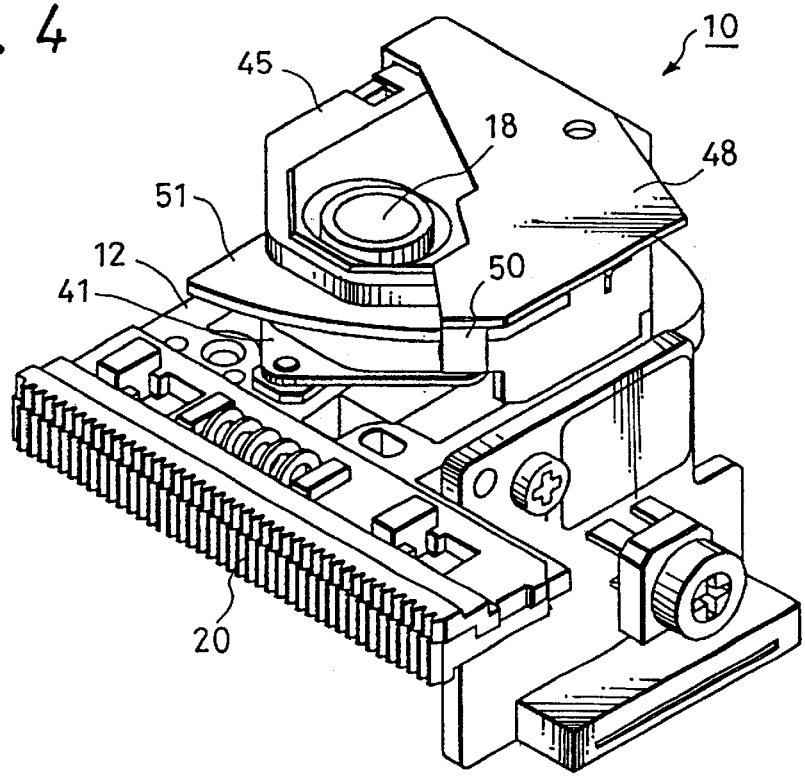
FIG. 4 is a perspective view of the optical pickup device, with a shutter being open.
Figure 5:
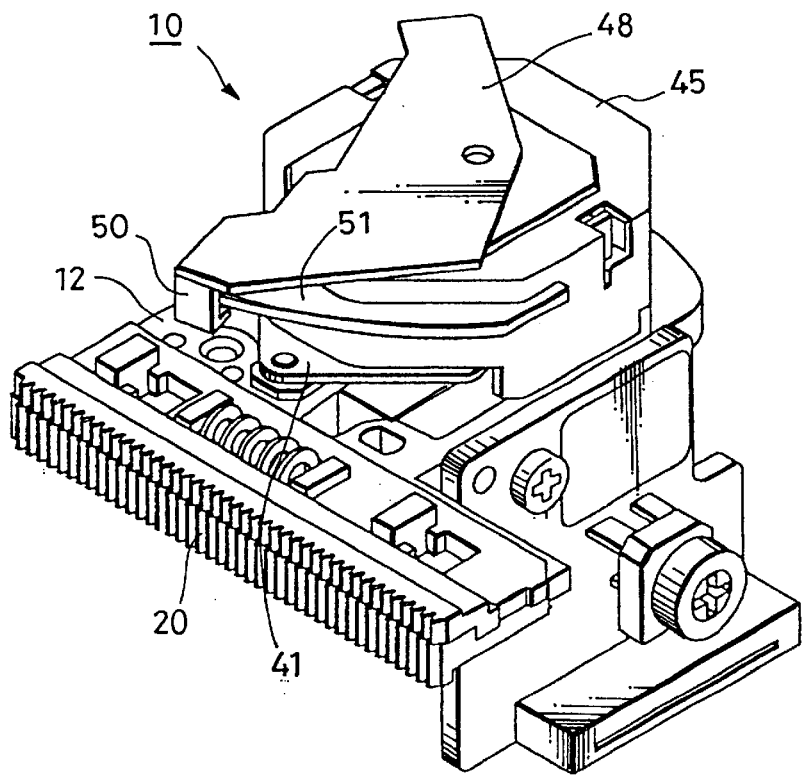
FIG. 5 is a perspective view of the optical pickup device, with the shutter being closed.

As shown in FIGS. 1 through 3, an optical disc 101 comprises a disc board 103 made of a transparent material such as polycarbonate and a signal recording layer 102 disposed on a principal surface of the disc board 103. The disc board 103 may have a diameter of 64 mm, 80 mm, or 120 mm, and has a circular chucking hole (positioning hole) 101a defined centrally therein.

A boundary surface between the disc board 103 and the signal recording layer 102 serves as a signal recording surface. A focused beam of light for reading a recorded information signal is applied through the disc board 103 to the signal recording surface. A spiral pattern of substantially concentric recording tracks is formed on the signal recording surface. If an information signal is recorded as pits, the pits are arranged along the recording tracks.

A radially inner position indicated by A on the optical disc 101 is referred to as a lead-in position where the recorded information signal starts to be read, and a radially outer position indicated by B on the optical disc 101 is referred to as a lead-out position where the recorded information signal ends being read. A range R which extends radially from the lead-in position to the lead-out position serves as a signal recording area on the signal recording surface.

As shown in FIGS. 1 and 2, the optical pickup device 10 is disposed on a chassis 1 in a disc player for reproducing the recorded information signal from the optical disc, making up a disc drive. The chassis 1 comprises a so-called floating chassis which is mounted by a plurality of dampers 3 on a movable frame 2 which is pivotally attached at its rear end by a shaft 2a to a fixed frame (not shown) of the disc player. The movable frame 2 is positioned below a disc tray 4 which is horizontally slid into and out of an outer housing (not shown), and can be angularly moved from a horizontal position to a lower position about the shaft 2a by a cam mechanism 5.

A spindle motor 6 is mounted on the chassis 1 near the free end of the movable frame 2 remotely from the shaft 2a. The spindle motor 6 has a drive shaft 6a projecting upwardly of the chassis 1 perpendicularly to the principal surface of the chassis 1. The drive shaft 6a has its proximal end rotatably supported by a bearing (not shown) disposed on the chassis 1. A substantially circular disc table 7 is mounted on the distal end of the drive shaft 6a, and has a conical centering pad 7a on an upper central area thereof. When the central region of the optical disc 101 is placed on the disc table 7, the conical centering pad 7a is fitted in the chucking hole 101a thereby centering the optical disc 101 with respect to the disc table 7, and a circumferential area of the optical disc 101 around the chucking hole 101a is placed on an outer circumferential flange of the disc table 7. The optical disc 101 thus positioned on the disc table 7 is then chucked by a chucking mechanism 60, and securely held on the disc table 7. At this time, the disc board 103 of the optical disc 101 faces downwardly toward the chassis 1.

When the spindle motor 4 is energized after the optical disc 101 is placed on the disc table 7, the optical disc 101 is rotated in unison with the disc table 7 by the drive shaft 6a. When the chassis 1 is angularly moved downwardly together with the movable frame 2 as indicated by the two-dot-and-dash lines in FIG. 2, the disc table 7 is retracted to a position below the disc tray 4. In this position, the optical disc 101 is transferred from the disc table 7 onto the disc tray 4, and can be unloaded as the disc tray 4 is ejected out of the outer housing.

As shown in FIG. 3, the optical pickup device 10 has an optical unit 11 including a housing 12 which accommodates a semiconductor laser 13 as a light source. A laser beam emitted from the semiconductor laser 13 passes through a diffraction grating 14, is reflected by a semi-transmitting mirror (beam splitter) 15 to change its direction of travel by 90°, and enters an objective lens 18 held by a lens holder 17 of an objective lens drive unit (two-axis actuator) 16 which is positioned above the optical unit 11. The diffraction grating 14 splits the laser beam into at least three beams (0th-order and ±1th-order beams). The objective lens 18 is positioned in confronting relationship to the signal recording surface 102 of the optical disc 101 that is held on the disc table 7. The objective lens 18 serves to focus the applied beam through the disc board 103 onto the signal recording surface 102 of the optical disc 101.

The beam focused onto the signal recording surface 102 is modulated in intensity by an information signal recorded on the signal recording surface 102 and then reflected by the signal recording surface 102. The reflected beam travels back through the objective lens 18 to the semi-transmitting mirror 15. The reflected mirror passes through the semi-transmitting mirror 15 and a detector system lens which comprises a concave lens, and is focused onto a photosensitive surface of a photodiode 19 as a photodetector. When the reflected beam passes through the semi-transmitting mirror 15, the semi-transmitting mirror 15 causes astigmatism because it acts as a plane-parallel plate lying obliquely to the path of the beam.

The photosensitive surface of the photodiode 19 is divided into a plurality of facets capable of independently generating electric signals indicative of the levels of beam intensities falling on the facets. The signals generated by the facets of the photodiode 19 are processed into a readout signal (RF signal) representing the information signal recorded on the optical disc 101, a focusing error signal, and a tracking error signal.

The focusing error signal is obtained by the astigmatic method, and indicates the distance between the beam spot focused by the objective lens 18 and the signal recording surface 102 of the optical disc 101 in the direction along the optical axis of the objective lens 18. The tracking error signal is obtained by the three-beam method, and indicates the distance the beam spot focused by the objective lens 18 and a recording track on the optical disc 101 in the radial direction of the optical disc 101, i.e., in the direction perpendicular to the optical axis of the objective lens 18.

As shown in FIGS. 1 and 2, the optical pickup device 10 is movably supported on a guide shaft 8 disposed on and extending along an upper surface of the chassis 1. The guide shaft 8 has opposite ends supported by support legs 8a mounted on the chassis 1. The optical unit 11 has a support hole through which the guide shaft 8 extends, and is movable axially along the guide shaft 8. The optical unit 11 is prevented from rotating about the guide shaft 8 by a stop bar 9 mounted on the chassis 1, holding the optical axis of the objective lens 18 perpendicular to the chassis 1.

A pickup feed mechanism 30 is mounted on the chassis 1 for moving the optical unit 11 along the guide shaft 8 on the chassis 1. The pickup feed mechanism 30 comprises a motor 31 having a vertical drive shaft 32 with a drive gear 33 mounted on an upper end thereof. The drive gear 33 is held in driving mesh with an idle gear 34 rotatably supported on the chassis 1. A small gear 35 coaxially coupled to the idle gear 34 is held in driving mesh with a driven gear 36 rotatably supported on the chassis 1. A pinion gear 37 is coaxially coupled to the driven gear 36 and held in driving mesh with rack teeth 20 on one side of the optical unit 11. The rack teeth 20 extend parallel to the guide shaft 8, and are combined with a backlash correcting mechanism (not shown).

When the motor 31 of the pickup feed mechanism 30 is energized, the optical unit 11 moves along the guide shaft 8 in the range R, i.e., the signal recording area, shown in FIG. 1. Upon movement of the optical unit 11, the optical pickup device 10 moves radially over the optical disc 101 supported on the disc table 7. The optical pickup device 10 can move radially outwardly beyond the lead-out position at the radially outer end of the range R or the signal recording area of the optical disc 101.

When the optical disc 101 is rotated by the spindle motor 6, the optical pickup device 10 reads an information signal recorded along the recording tracks of the optical disc 101 along the recording tracks.

When the optical disc 101 is rotated, the readout position where the optical pickup device 10 reads an information signal from any of the recording tracks is periodically reciprocally moved radially of the optical disc 101 because of an off-center deviation of the center of curvature of the recording track from the center of rotation of the optical disc 101, i.e., the central axis of the drive shaft 6a of the spindle motor 6. In addition, the readout position on the signal recording surface is also periodically reciprocally moved perpendicularly to the signal recording surface due to a distortion or planarity error of the disc board 103 of the optical disc 101.

To cope with such an off-center deviation and planarity error, the optical pickup device 10 has the objective lens drive unit (two-axis actuator) 16. The objective lens drive unit 16 supports the objective lens 18 for movement along both the optical axis (focusing direction) thereof and a direction (tracking direction) normal to the optical axis, i.e., a radial direction of the optical disc 101.

Figure 6:
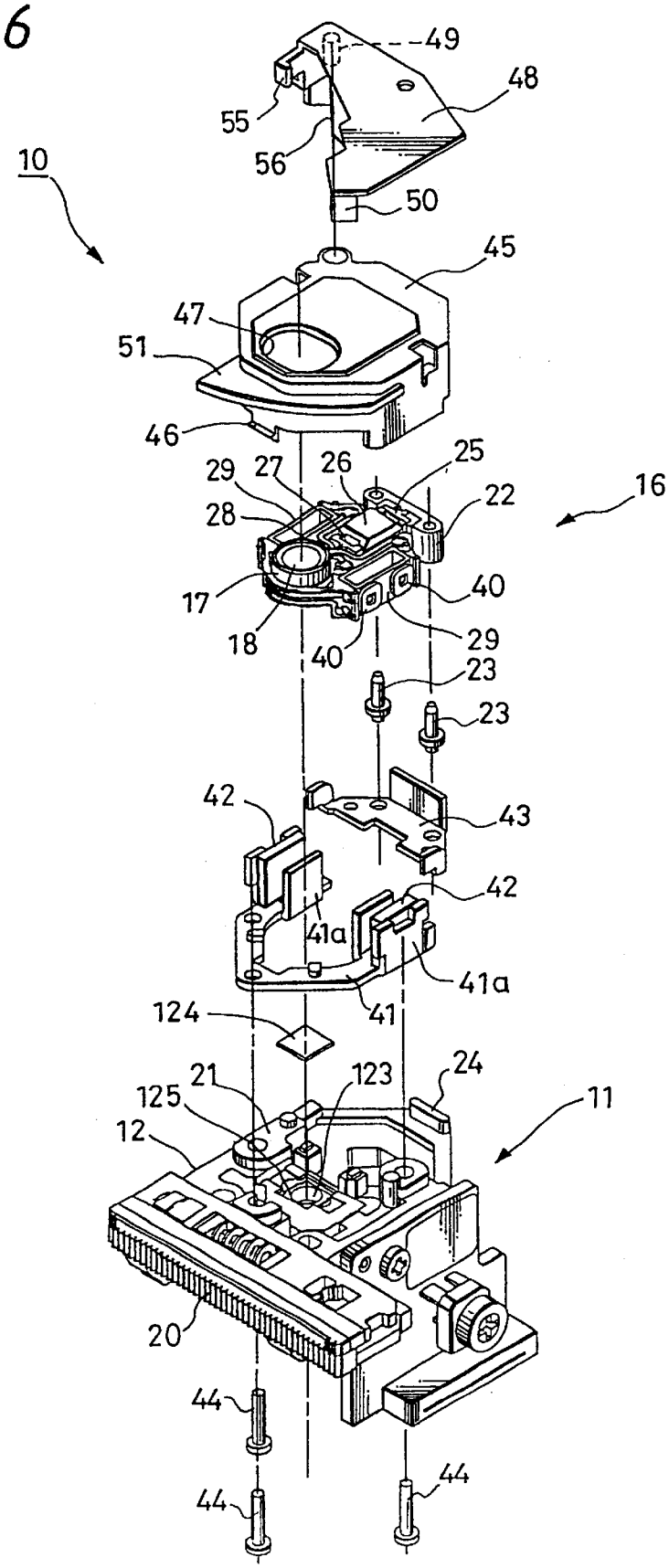
FIG. 6 is an exploded perspective view of the optical pickup device.
Figure 7:
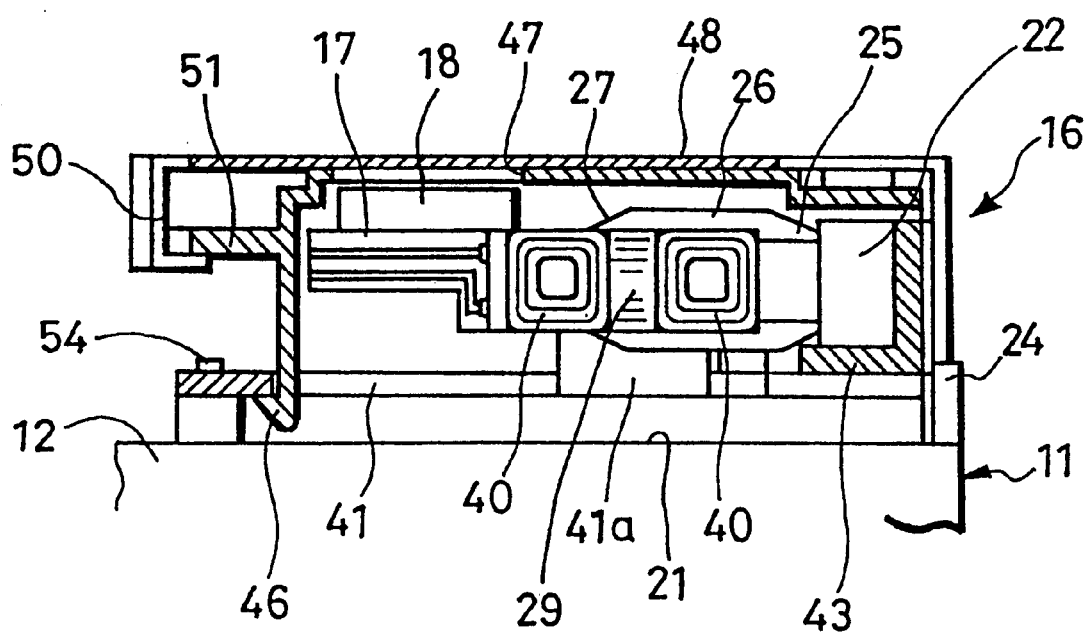
FIG. 7 is a vertical cross-sectional view of an upper portion of the optical pickup device.

As shown in FIGS. 6 and 7, the objective lens drive unit 16 has an actuator base 21 which comprises an upper panel of the housing 12 of the optical unit 11, and a support block 22 disposed on the actuator base 21. The support block 22 has a pair of support holes through which respective support pins 23 extend into the actuator base 21, thus connecting the support block 22 to the actuator base 21. An upstanding support wall 24 is mounted on a rear edge of the actuator base 21 and supports a rear face of the support block 22. To a front face of the support block 22, there is pivotally attached a proximal end of an arm 26 through a first hinge 25 parallel to an upper surface of the actuator base 21. The arm 26 has a distal end to which there is connected a front plate through a second hinge 27 parallel to the upper surface of the actuator base 21. An attachment plate is joined to a front face of the front plate through a third hinge 28 perpendicular to the upper surface of the actuator base 21.

The components ranging from the support block 22 to the attachment plate are integrally formed of a flexible and resilient material such as a synthetic resin material. The arm 26 is angularly movable about the first hinge 25 to displace its distal end vertically. The front plate is vertically movable toward and away from the actuator base 21 by the first and second hinges 25, 27 while the third hinge 28 is lying perpendicularly to the upper surface of the actuator base 21. The attachment plate is displaceable in directions parallel to the upper surface of the actuator base 21 by the third hinge 28.

The lens holder 17 is attached to the attachment plate, and the objective lens 18 is mounted on the lens holder 17 near its front edge. Specifically, the objective lens 18 is fitted in a through hole defined in the lens holder 17 and has its outer circumferential edge supported by the inner circumferential edge of the through hole.

Two focusing coils 29 are mounted respectively on opposite sides of the lens holder 17, and two pairs of tracking coils 40 are also mounted respectively on the opposite sides of the lens holder 17. A pair of magnetic circuits is disposed on the actuator base 21 for placing the coils 29, 40 in magnetic fields. Specifically, the magnetic circuits comprise respective upstanding U-shaped yokes 41a mounted on respective opposite ends of a substantially U-shaped yoke base 41, and respective magnets 42 attached to the respective yokes 41a. Specifically, the magnets 42 are attached to respective arms of the yokes 41a, which have other arms extend respectively into the focusing coils 29. The magnetic circuits generate magnetic fields of looped fluxes extending from the magnets 42 through the arms of the yokes 41a and back to the magnets 42. The coils 29, 40 are positioned in the magnetic fields thus generated by the magnetic circuits.

An adjustment plate 43 is connected between opposite rear ends of the yoke base 41 at the yokes 41a, and the yoke base 41 is fastened by threaded pins 44 to the upper panel of the housing 12. The support block 22 is fixed to the adjustment plate 43 by the support pins 23.

When the focusing coils 29 are supplied with a drive current based on the focusing error signal, the lens holder 17 which supports the objective lens 18 moves along the optical axis of the objective lens 18. When the tracking coils 40 are supplied with a drive current based on the tracking error signal, the lens holder 17 moves the objective lens 18 in a direction perpendicular to the optical axis of the objective lens 18.

When the objective lens 18 is thus moved by the objective lens drive unit 16, the beam spot focused by the objective lens 18 is positioned on a desired one of the recording tracks at all times while following periodical fluctuations of the recording tracks.

The objective lens drive unit 16 is enclosed by a cover 45 to prevent dust and dirt particles from being deposited on the movable components and the objective lens 15 thereof. As shown in FIGS. 4 through 7, the cover 45 is made of a synthetic material and comprises a downwardly open housing-substantially in the shape of a rectangular parallelepiped. The cover 45 has a plurality of teeth 46 projecting downwardly from its lower edge. The teeth 46 are held in engagement with the yoke base 41 fixed to the actuator base 21, thus securing the cover 45 to the actuator base 21 and hence the housing 12 of the optical unit 11.

The cover 45 has a window hole 47 defined in an upper panel thereof at a position above the objective lens 18. The window hole 47 has a diameter greater than the diameter of the objective lens 18. The window hole 47 is large enough to cover the range in which the objective lens 18 is moved by the objective lens drive unit 16. Therefore, the window hole 47 allows the laser beam emitted from the objective lens 18 to pass therethrough upwardly of the cover 45.

The optical pickup device 10 has a shutter 48 angularly movably mounted on the cover 45 for selectively opening and closing the window hole 47. As shown in FIGS. 4 through 8, the shutter 48 comprises a substantially crescent-shaped flat plate having an end pivotally connected to the cover 45 by a support shaft 49. The shutter 48 is positioned over the upper panel of the cover 45, and can be angularly moved about the support shaft 49 to selectively open and close the window hole 47.

The shutter 48 has an engaging hook 50 extending downwardly from a free end thereof remote from the support shaft 49 and facing an outer peripheral surface of the cover 45. An arcuate guide flange 51, which extends about the support shaft 49, projects horizontally from the outer peripheral surface of the cover 45 and extends from a front portion of one side of the cover 45 toward a front end of the cover 45. The engaging hook 50 has a lower end slidably engaging the arcuate guide flange 51 for guiding the shutter 48 to turn about the support shaft 49 in substantial sliding contact with the upper panel of the cover 45. When the shutter 48 is positioned over the window hole 47, the shutter 48 closes and substantially seals the window hole 47.

Figure 8:
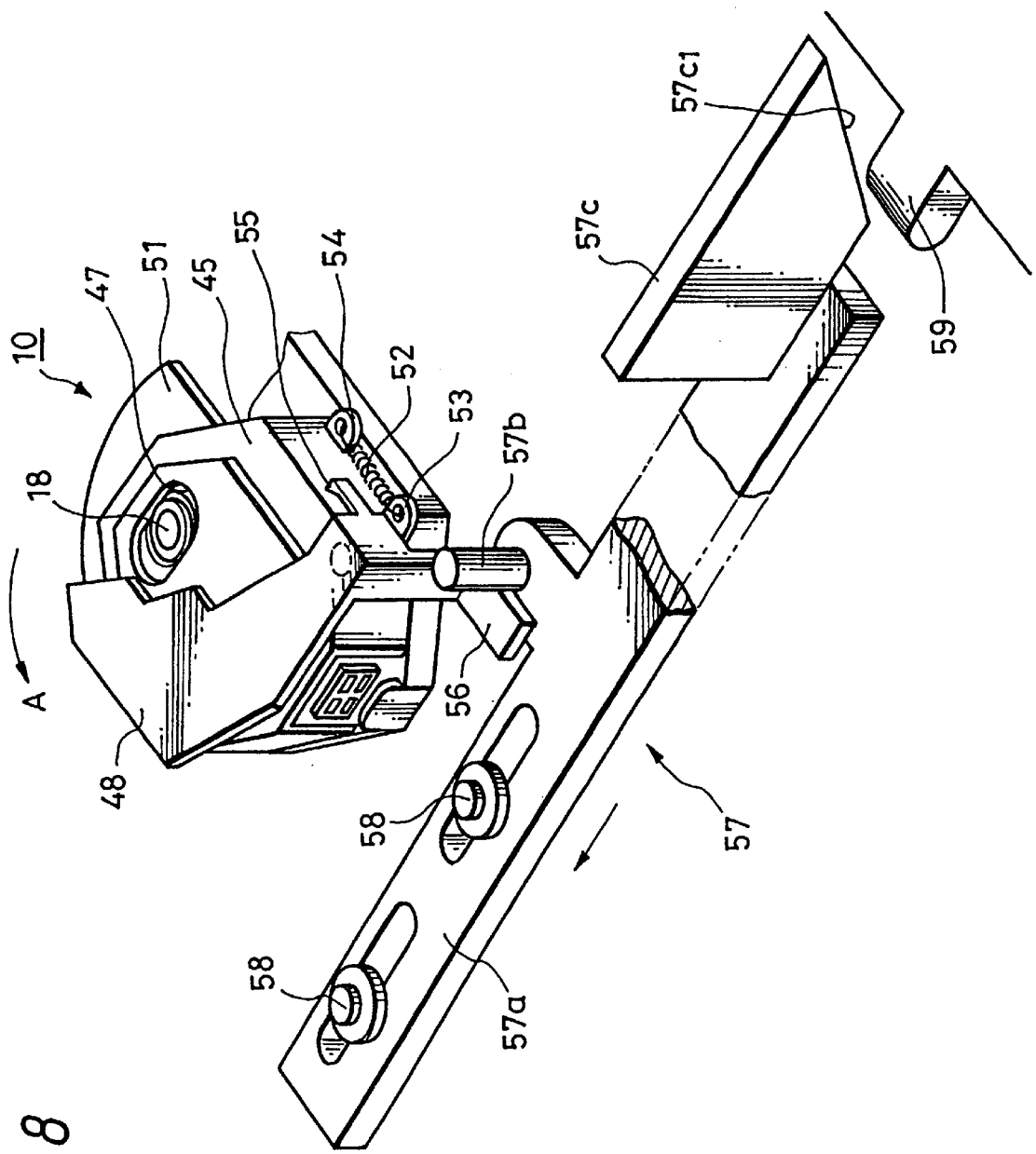
FIG. 8 is a perspective view of the optical pickup device and a shutter closing member.

The shutter 48 is normally urged by a spring 52 in a direction to open the window hole 57 as indicated by the arrow A in FIG. 8.

The spring 52 comprises a tension spring connected between a spring retainer 53 projecting from the pivoted end of the shutter 48 and spring retainer 54 projecting from a front portion of the other side of the cover 45. The shutter 48 has an abutment stop 55 projecting laterally from the pivoted end thereof and normally held against the other side of the cover 45 for preventing the shutter 48 from angularly moving beyond a given angular position shown in FIG. 8.

The shutter 48 also has an engagement finger 56 projecting downwardly from the pivoted end thereof. When the engagement finger 56 is engaged and pushed by a shutter closing member (described below), the shutter 48 is angularly moved about the support shaft 49 against the bias of the spring 52 for thereby closing the window hole 47.

As shown in FIGS. 1, 2, and 8, a shutter closing member 57 for closing the shutter 48 is mounted on the chassis 1 near the range in which the optical pickup device 10 is movable, i.e., on a side of the chassis 1 extending from a region where the optical pickup device 10 is positioned at the radially inner end of the signal recording area on the optical disc 101 to the disc table 7.

The shutter closing member 57 comprises an elongate slider 57a longitudinally slidably supported on the chassis 1 by a pair of longitudinally spaced support pins 58 projecting upwardly from the chassis 1 through respective longitudinally oblong holes defined in the slider 57a. The slider 57a has an upwardly projecting boss 57b positioned substantially longitudinally centrally thereon for engagement with a front edge of the engagement finger 56. A vertical sliding cam 57c is mounted upwardly on a front end of the slider 57a remotely from the support pins 58. The sliding cam 57c has a slanted cam surface 57c1 on its front end which is inclined backward in the downward direction and projects forward beyond a front end (free end) of the movable frame 2.

The fixed frame (not shown) of the disc player has a pusher 59 projecting toward the slanted cam surface 57c1 of the sliding cam 57c.

When the optical disc 101 is ejected from the disc player after it has been played back, the optical pickup device 10 is moved radially inwardly of the signal recording area of the optical disc 101. The movable frame 2 is angularly moved downwardly, and the chassis 1 is also lowered, depressing the disc table 7 below the disc tray 4. The slanted cam surface 57c1 of the sliding cam 57c is also lowered and then engaged by the pusher 59.

Further downward movement of the chassis 1 causes the slanted cam surface 57c1 to slide against the pusher 59, pushing the sliding cam 57c and hence the slider 57a slidably backward as indicated by the arrow in FIG. 8.

Upon the backward sliding movement of the slider 57a, the boss 57b engages and pushes the front edge of the engagement finger 56. The shutter 48 is now angularly moved about the support shaft 49 with respect to the cover 45 against the bias of the spring 52 for thereby closing the window hole 47. Since the window hole 47 is closed by the shutter 48, the objective lens 18 is protected against damage, smear, and deposits of dust and dirt particles.

When the disc table 7 on the chassis 1 is completely retracted downwardly of the disc tray 4, the optical disc 101 is transferred from the disc table 7 onto the disc tray 4, and can be unloaded as the disc tray 4 is ejected out of the outer housing.

After the optical disc 101 is ejected, the window hole 47 of the cover 45 remains closed by the shutter 48 insofar as the chassis 1 is kept in the lowered position, continuously protecting the objective lens 18 against damage, smear, and deposits of dust and dirt particles.

When the movable frame 2 is angularly moved upwardly, the chassis 1 is lifted, bringing the sliding cam 57c out of sliding engagement with the pusher 59. Therefore, the engagement finger 56 is released from the boss 57a, whereupon the shutter 48 is angularly moved back in the direction indicated by the arrow A in FIG. 8 under the bias of the spring 52. The window hole 47 is now opened, exposing the objective lens 18 to make the optical pickup device 10 ready for playing back another optical disc. As the shutter 48 is angularly moved to open the window hole 47, the boss 57a is pushed back by the engagement finger 56 for thereby moving the shutter closing member 57 slidably forward toward the pusher 59.

In response to the ascent of the chassis 1, the disc table 7 is elevated above the disc tray 4, carrying an optical disc 101 transferred from the disc tray 4. The optical disc 101 is then chucked on the disc table 7 by the chucking mechanism 60. The optical disc 101 is now ready for being rotated by the spindle motor 6.

The movable frame 2 is illustrated as being angularly moved to lift and lower the chassis 1. However, the chassis 1 may be lifted and lowered by a movable frame which is vertically movable while lying horizontally.

As described above, when the window hole 47 is closed by the shutter 48, the objective lens 18 is protected against damage, smear, and deposits of dust and dirt particles. When the window hole 47 is opened by the shutter 48, the objective lens 18 can be cleaned to remove deposited dust and dirt particles.

As shown in FIG. 3, the semiconductor laser 13, the diffraction grating 14, and the semi-transmitting mirror (beam splitter) 15 are housed in a cavity 121 defined in the housing 12, and the photodiode 19 is mounted on a lower surface of the housing 12 beneath a lower opening of the cavity 121. The housing 12 also has a light guide hole 122 defined therein and extending upwardly from the cavity 121 for guiding the laser beam from the cavity 121 toward the objective lens 18. The light guide hole 122 has an upper opening 123 which is fitted with a light-transmissive optical plate 124 that may comprise a transparent optical plate.

The light-transmissive optical plate 124 comprises a truly flat, rectangular plate of a transparent material such as glass, acrylic resin, or the like, having a thickness of 0.5 mm, for example. The light-transmissive optical plate 124 is fitted over the opening 123 of the light guide hole 122 and lies perpendicularly to the optical axis of the objective lens 18 held by the lens holder 17. Therefore, the light guide hole 122 is sealed by the light-transmissive optical plate 124.

Figure 9:
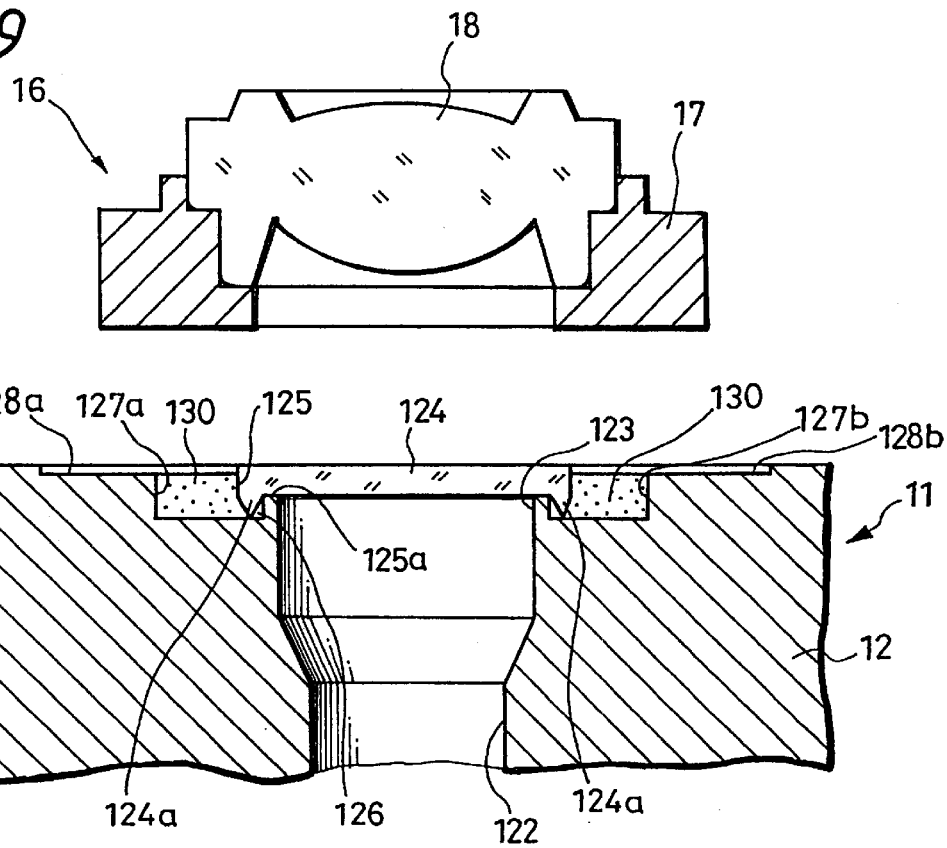
FIG. 9 is an enlarged fragmentary sectional front elevational view of the optical pickup device.
Figure 10:
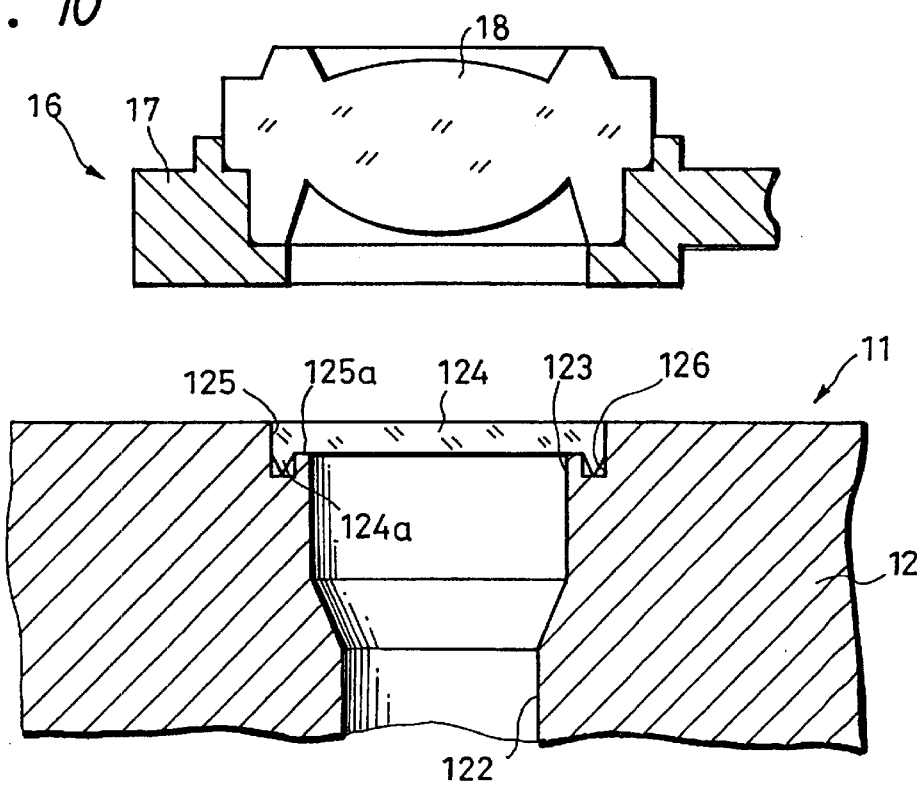
FIG. 10 is an enlarged fragmentary sectional side elevational view of the optical pickup device.

More specifically, as shown in FIGS. 9 and 10, the light-transmissive optical plate 124 is securely fitted in a recess 125 defined in the upper surface of the housing 12 around the opening 123 of the light guide hole 122. The recess 125 has a depth which is substantially the same as the thickness of the light-transmissive optical plate 124, and an outer profile which is substantially the same as the outer profile of the light-transmissive optical plate 124. The recess 125 has a flat bottom surface 125a lying perpendicularly to the optical axis of the objective lens 18 and surrounded by burr receptacle grooves 126 defined in the housing 12.

The housing 12 also has a pair of adhesive filling grooves 127a, 127b defined in its upper surface, one on each side of the recess 125, and a pair of shallow recesses 128a, 128b defined in its upper surface immediately outside of the adhesive filling grooves 127a, 127b.

To install the light-transmissive optical plate 124, the light-transmissive optical plate 124 is fitted in the recess 125. At this time, burrs 124a remaining on peripheral edges of the light-transmissive optical plate 124 are received in the burr receptacle grooves 126 around the bottom 125a of the recess 125. Therefore, the light-transmissive optical plate 124 is fitted in intimate contact with the bottom 125a of the recess 125.

With the light-transmissive optical plate 124 closely fitted in the recess 125, the adhesive filling grooves 127a, 127b are filled up with an adhesive 130. The adhesive 130 may be an ultraviolet-curable adhesive, for example. When the filled adhesive 130 is cured, the light-transmissive optical plate 124 is firmly fixed in the recess 125, i.e., to the housing 12. Even if the adhesive 130 overflows the adhesive filling grooves 127a, 127b, the excessive adhesive flows into the shallow recesses 128a, 128b immediately outside of the adhesive filling grooves 127a, 127b. Because of the shallow recesses 128a, 128b, therefore, the adhesive 130 when cured does not protrude upwardly from the upper surface of the housing 12, which is thus kept flat.

The light-transmissive optical plate 124 fitted in the recess 125 sealingly closes the light guide hole 122 in the housing 12 to prevent ambient air from entering the cavity 121, which houses the various optical components therein, while allowing the laser beam from the semiconductor laser 13 to pass therethrough toward the objective lens 18.

Consequently, the semiconductor laser 13, the diffraction grating 14, the semi-transmitting mirror (beam splitter) 15, and the photodiode 19 are protected against deposits of dust and dirt particles. The gap between the light-transmissive optical plate 124 and the objective lens 18 can easily be cleaned by a brush, for example, to keep clean the light-transmissive optical plate 124 which faces the objective lens 18. Accordingly, the optical pickup device 10 can operate for a relatively long service life.

Inasmuch as the light-transmissive optical plate 124 is fitted in the recess 125 perpendicularly to the optical axis of the objective lens 18, the light-transmissive optical plate 124 does not refract the laser beam emitted from the light guide hole 122, but transmits the laser beam accurately along the optical axis to the objective lens 18, which can thus focus the laser beam accurately and reliably onto the signal recording surface 102 of the optical disc 101.

In the illustrated embodiment, the light-transmissive optical plate 124 seals the cavity 121 which houses the optical components and the light guide hole 122 connected to the cavity 121 to protect the optical components against deposits of dust and dirt particles, and the shutter 48 selectively closes the window hole 47 which passes the laser beam therethrough to prevent dust and dirt particles from being deposited on the objective lens 18 and the objective lens drive unit 16.

However, the principles of the present invention are not limited to a combination of the light-transmissive optical plate 124 and the shutter 48, but are applicable to an ordinary optical pickup device or an optical disc device which does not have a shutter with respect to the objective lens.

The configuration of the cavity 121 and the light guide hole 122 may be modified as desired depending on the layout of the optical components of the optical unit 11. The light-transmissive optical plate 124 is not limited to the rectangular shape, but may be of a circular shape. The optical components of the optical unit 11 may be modified as desired.

According to the present invention, as described above, since the cavity 121 which houses the optical components and the light guide hole 122 connected to the cavity 121 are sealed and closed by the light-transmissive optical plate 124, the optical components are protected against deposits of dust and dirt particles. Furthermore, the gap between the optical unit 11 and the objective lens 18 can be cleaned to remove any deposited dust and dirt particles therefrom for allowing the laser beam to be transmitted accurately and reliably between the optical unit 11 and the objective lens 18 for reading recorded information from the optical disc 101 highly accurately and reliably. In addition, the window hole 47 which passes the laser beam therethrough is selectively closed by the shutter 48 to prevent dust and dirt particles from being deposited on the objective lens 18 and the objective lens drive unit 16.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An optical pickup device adapted to be positioned in confronting relationship to an optical recording medium for reading an information signal from and/or writing an information signal on the optical recording medium, comprising:

an optical unit having at least a light source for emitting a light beam and a photodetector for detecting a light beam returned from the optical recording medium;

said optical unit further comprising a light guide for guiding the light beam toward said objective lens and a light-transmissive optical plate covering said light guide;

an objective lens for converging the light beam emitted from said light source onto a signal-recording surface of the optical recording medium;

a cover having an opening for passing the light beam emitted from said light source, said cover covering at least a portion of said objective lens;

said cover further comprising a shutter for selectively opening and closing said opening of the cover, said shutter being mounted on said cover, at least one of said shutter and said cover having a support shaft and the other of said shutter and said cover having a bearing portion for rotatably supporting said support shaft, whereby said shutter is rotatably supported by said cover;

a guide flange extending about said support shaft and projecting from an outer peripheral surface of said cover, said shutter having an engaging hook extending from said shutter, said engaging hook slidably engaging said guide flange for guiding said shutter;

a spring connected between said shutter and said cover.

2. The optical pickup device according to claim 1, wherein said spring is connected to said shutter and said cover.

* * * * *